United States Patent [19]

Krapchev

[11] Patent Number: 5,414,723
[45] Date of Patent: * May 9, 1995

[54] INFRARED LASER SYSTEM

[76] Inventor: Vladimir B. Krapchev, 80 Park St., Brookline, Mass. 02146

[*] Notice: The portion of the term of this patent subsequent to Oct. 6, 2009 has been disclaimed.

[21] Appl. No.: 104,081
[22] PCT Filed: Feb. 14, 1992
[86] PCT No.: PCT/US92/01230
§ 371 Date: Aug. 11, 1993
§ 102(e) Date: Aug. 11, 1993
[87] PCT Pub. No.: WO92/15137
PCT Pub. Date: Sep. 3, 1992

Related U.S. Application Data

[63] Continuation-in-part of Ser. No. 657,641, Feb. 15, 1991, Pat. No. 5,153,887.

[51] Int. Cl.$^6$ .................... H01S 3/30
[52] U.S. Cl. .................... 372/3; 372/4; 372/51
[58] Field of Search .................... 372/3, 4, 51

[56] References Cited

U.S. PATENT DOCUMENTS

| | | | |
|---|---|---|---|
| 3,668,420 | 6/1972 | Vanderslice | 302/88.3 |
| 4,254,348 | 3/1981 | Stappaerts | 307/426 |
| 4,327,337 | 4/1982 | Liu | 372/3 |
| 4,973,157 | 11/1990 | Krasinski et al. | 372/3 |
| 5,153,887 | 10/1992 | Krapchev | 372/3 |

OTHER PUBLICATIONS

J. G. Meadors et al, "Generation of Infrared Radiation . . ." J. Quantum Electronics, vol. QE-8, No. 4, Apr. 1972, pp. 427–428.
A. V. Krumin'sh et al, Sov. J. Quantum Electron, vol. 14, No. 7, Jul. 1984, pp. 1001–1002.
C. Guntermann et al, Applied Optics, vol. 28, No. 1, 1 Jan. 1989, pp. 135–138.
E. Patterson et al, Applied Optics, vol. 28, No. 23, 1 Dec. 1989, pp. 4978–4981.
J. Hampton, "A Terrestrial Optical Scatter Communications Model", 1989, pp. 263–268.
M. J. Colles, Optics Communications, vol. 1, No. 4, Sep./Oct. 1963, pp. 169–172.
D. C. Hanna et al, IEEE J. Quantum Electronics, vol. QE-22, No. 2, Feb. 1986, pp. 332–336.
T. R. Loree, IEEE J. Quantum Electronics, vol. QE-15, No. 5, May 1979, pp. 337–342.
J. J. Ottusch et al, IEEE J. Quantum Electronics, vol. 24, No. 10, Oct. 1988, pp. 2076–2080.
"Tables of Molecular Vibrational Frequencies, v.1", Nat. Bureau of Standards, 1972, pp. 63–66.
C. J. Pouchert, "The Aldrich Library of IR Spectra" 2nd Ed., 1978 (one sheet).
D. Schiel et al, Chemical Physics Letters, vol. 166, No. 1, 9 Feb. 1990, pp. 82–86.
S. J. Pfeifer, Proc. SPIE, vol. 1000, Laser Wavefront Control, 1988, pp. 33–42.
J. Munch et al, Applied Optics, vol. 28, No. 15, 1 Aug. 1989, pp. 3099–3105.
D. Stern et al, Opthamology, vol. 95, No. 10, Oct. 1988, pp. 1434–1441.
M. Falk et al, J. Chemical Physics, vol. 34, No. 5, May 1961, pp. 1554–1568.
Kaiser W., "Transient Stimulated Raman Scattering. Relaxation Times of Molecular Vibrations", Sov. J. Quant. Electron., vol. 4, No. 9, Mar. 1975, New York, pp. 1131–1134.

*Primary Examiner*—James W. Davie
*Attorney, Agent, or Firm*—Wolfe, Greenfield & Sacks

[57] ABSTRACT

An infrared laser system includes a neodymium laser for generating a pulsed laser beam at a wavelength of 1.06 micrometers and a Raman cell containing a Raman active medium. The laser beam, having sufficient peak power to cause emission of light from the Raman active medium by stimulated Raman scattering, is directed through the Raman cell. Ethanol-$d_1$ or methanol-$d_1$ is used as the Raman active medium to generate wavelengths of about 1.5 micrometers, 2.8–2.9 micrometers, or both. The laser is preferably a neodymium YAG laser.

27 Claims, 6 Drawing Sheets

FIG. 1

EXPERIMENTAL DATA OF THE TRANSMISSION SPECTRUM OF METHANOL ($CH_3OH$)

EXPERIMENTAL DATA OF THE TRANSMISSION SPECTRUM OF ETHANOL-$D_1$
($CH_3 CH_2 OD$)

FIG. 4

EXPERIMENTAL DATA OF THE TRANSMISSION SPECTRUM OF ETHANOL-D,
(CH₃CH₂OD)

FIG. 5

EXPERIMENTAL DATA OF THE TRANSMISSION SPECTRUM OF ETHANOL-$D_1$ ($CH_3CH_2OD$), THE UPPER CURVE AND A SOLUTION OF ETHANOL-$D_1$ AND 40% DEUTERATED GLYCEROL ($CH_2CHCH_2(OD)_3$), THE LOWER CURVE.

INFRARED LASER SYSTEM

RELATED APPLICATION

This application is a continuation-in-part of U.S. application Ser. No. 07/657,641 filed Feb. 15, 1991, now U.S. Pat. No. 5,153,887, the entire disclosure of which is incorporated herein by reference.

FIELD OF THE INVENTION

This invention relates to laser systems for generating radiation at wavelengths of about 1.5 micrometers and wavelengths of about 2.8-2.9 micrometers and, more particularly, to laser systems for frequency shifting the light from a neodymium laser by stimulated Raman scattering.

BACKGROUND OF THE INVENTION

A desirable wavelength for laser radar (lidar) and over-the-horizon optical communications is 1.5 micrometers because this wavelength is considered to be eyesafe. Wavelengths in the range of about 2.8-2.9 micrometers have been found useful for medical applications such as laser surgery because these wavelengths are highly absorbed by the water in tissue and thus are effective for vaporizing tissue. However, reliable, low cost, high power lasers for directly generating such wavelengths are not commercially available.

Pulsed neodymium-doped yttrium aluminum garnet (Nd:YAG) lasers are commercially available from a number of suppliers and are used in many fields due to their relatively low cost, large average and peak powers and high pulse repetition frequencies. A well-known method for frequency shifting a laser toward longer wavelengths is by stimulated Raman scattering. A laser beam is directed through a Raman cell containing a Raman active medium. When the intensity of the laser beam exceeds a threshold value, light is emitted by the Raman medium at a wavelength that is longer than the wavelength of the laser beam. The output of the Raman cell includes light at the laser wavelength and at the shifted wavelength. The frequency shift and the conversion efficiency are characteristics of the Raman medium.

The use of methane for Raman shifting of a neodymium YAG laser output at 1.06 micrometers to a wavelength of 2.8 micrometers is disclosed by Guntermann et al in *Applied Optics*, Vol. 28, No. 1, Jan. 1, 1989, pages 135–138. Medical applications are suggested. The generation of 1.54 micrometer radiation for laser radar using methane as a Raman active medium is disclosed by Patterson et al in *Applied Optics*, Vol. 28, No. 23, Dec. 1, 1989, pages 4978–4981. Deposition of soot-like particles on the Raman cell windows was reported to limit the operating life of the system.

Raman scattering using methyl, ethyl and isopropyl alcohol, acetone, trichloroethane and water as Raman active media is disclosed by Colles in *Optics Communications*, Vol. 1, No. 4, September/October 1969, pages 169–172. Picosecond pulses at 530 nanometers, which were provided by second harmonic generation of the output of a neodymium glass laser, were used as the pump pulses.

Efficient conversion of light from 30 picosecond pulses of a Nd:YAG laser at 1.064 micrometers to the first Stokes component at 1.53–1.56 micrometers in cyclohexane, acetone, 1,2-dichloroethane and 1,4-dioxane is disclosed by Krumin'sh et al in *Soviet Journal of Quantum Electronics*, Vol. 14, No. 7, July 1984, pages 1001–1002.

Raman conversion in acetonitrile and methane to the eye-safe wavelength near 1.5 micrometers from a Q-switched Nd:YAG laser is disclosed by Meadors and Poirier in *IEEE Journal of Quantum Electronics*, Vol. QE-8, No.4, April 1972, pages 427–428.

Stimulated Raman scattering of 100 picosecond pulses in hydrogen, deuterium and methane is disclosed by Hanna et al in *IEEE Journal of Quantum Electronics*, Vol. QE-22, No. 2, February 1986, pages 332–336. A mode-locked and Q-switched neodymium YAG laser followed by a second harmonic generator was used to generate pump pulses at 1.06 micrometers and 0.53 micrometers. The use of hydrogen, deuterium and methane as Raman active media are also disclosed by Lorre et al in *IEEE Journal of Quantum Electronics*, Vol. QE-15, No. 5, May 1979, pages 337–342 and by Ottusch et al in *IEEE Journal of Quantum Electronics*, Vol. 24, No. 10, October 1988, pages 2076–2080.

A Raman cell positioned inside a neodymium YAG laser resonant cavity is disclosed in U.S. Pat. No. 4,327,337, issued Apr. 27, 1982 to Liu. Deuterium is suggested as a Raman active medium. A 1.5 micron Raman laser is disclosed in U.S. Pat. No. 3,668,420, issued Jun. 6, 1972 to Vanderslice. A laser system for generating radiation in the ultraviolet wavelength range using a plurality of Raman cells is disclosed in U.S. Pat. No. 4,254,348, issued Mar. 3, 1981 to Stappaerts. Deuterium is disclosed as a Raman active medium.

All-the known techniques for generation of radiation at 1.5 micrometers and 2.8-2.9 micrometers have been subject to one or more problems, including a short operating life, low efficiency and Brillouin backscattering from the Raman active medium. It is desirable to provide laser systems which overcome these problems.

It is a general object of the, present invention to provide improved laser systems.

It is another object of the present invention to provide laser systems for efficient Raman shifting of the 1.06 micrometer radiation from a neodymium laser to about 1.5 micrometers.

It is a further object of the present invention to provide laser systems for efficient Raman shifting of the 1.06 micrometer radiation from a neodymium laser to about 2.8-2.9 micrometers.

It is another object of the present invention to provide reliable, long life laser systems for generating radiation at about 1.5 micrometers and about 2.8-2.9 micrometers.

It is yet another object of the present invention to provide Raman active media for efficient conversion of 1.06 micrometer radiation to radiation at about 1.5 micrometers and about 2.8-2.9 micrometers.

SUMMARY OF THE INVENTION

According to the present invention, these and other objects and advantages are achieved in an infrared laser system including a neodymium laser for generating a pulsed laser beam at a wavelength of 1.06 micrometers, a Raman cell containing a Raman active medium and means for coupling the laser beam through the Raman cell, the laser beam having sufficient peak power to cause emission of light from the Raman active medium by stimulated Raman scattering. Depending on the Raman active medium and the peak power of the laser beam, the output of the laser system is at a wavelength of about 1.5 micrometers, at a wavelength of about 2.8–2.9 micrometers, or both. The Raman active media in accordance with the invention convert the laser beam at 1.06 micrometers to the desired wavelengths with high efficiency.

The Raman active medium comprises ethanol-$d_1$ which provides an output wavelength of 1.54 micrometers, 2.79 micrometers, or both, or methanol-$d_1$ which provides output wavelengths of 1.51 micrometers and 1.54 micrometers, 2.8–2.9 micrometers, or both.

According to one feature of the invention, the laser comprises a mode-locked neodymium YAG laser having a pulse width of 100 picoseconds or less.

According to another feature of the invention, the laser comprises a broadband, Q-switched neodymium YAG laser having a pulse width of one nanosecond or greater. The laser has a bandwidth $\Gamma_B$ greater than one $cm^{-1}$.

According to a further feature of the invention, stimulated Brillouin backscattering is reduced by increasing the viscosity of the fluids to provide Raman conversion independent of the laser pulselength and bandwidth. When ethanol-$d_1$ and methanol-$d_1$ are mixed with deuterated glycerol ($CH_2ODCHODCH_2OD$), one finds that the solution is transparent at the relevant wavelengths and can have a viscosity greater by a factor of 10. In such a solution, the Raman scattering dominates Brillouin backscattering. A similar effect can be achieved by cooling the pure deuterated alcohols below $-50°$ C., but this appears less attractive in practice.

In the laser system, the means for coupling the laser beam through the Raman cell typically includes a lens for focusing the laser beam in the Raman active medium. The coupling means preferably further includes a polarizer and a Faraday rotator for isolating the laser from radiation that is backscattered from the Raman cell.

The Raman cell includes an input window for receiving the laser beam, an output window and means for containing the Raman active medium between the input window and the output window. The Raman cell typically includes means for cooling the Raman active medium. The Raman active medium can be circulated through the Raman cell.

The laser system according to the invention typically includes an output lens for collimating the output of the Raman cell. The outputs of the Raman cell can be separated into individual wavelengths by one or more dichroic beam splitters or prisms.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1:
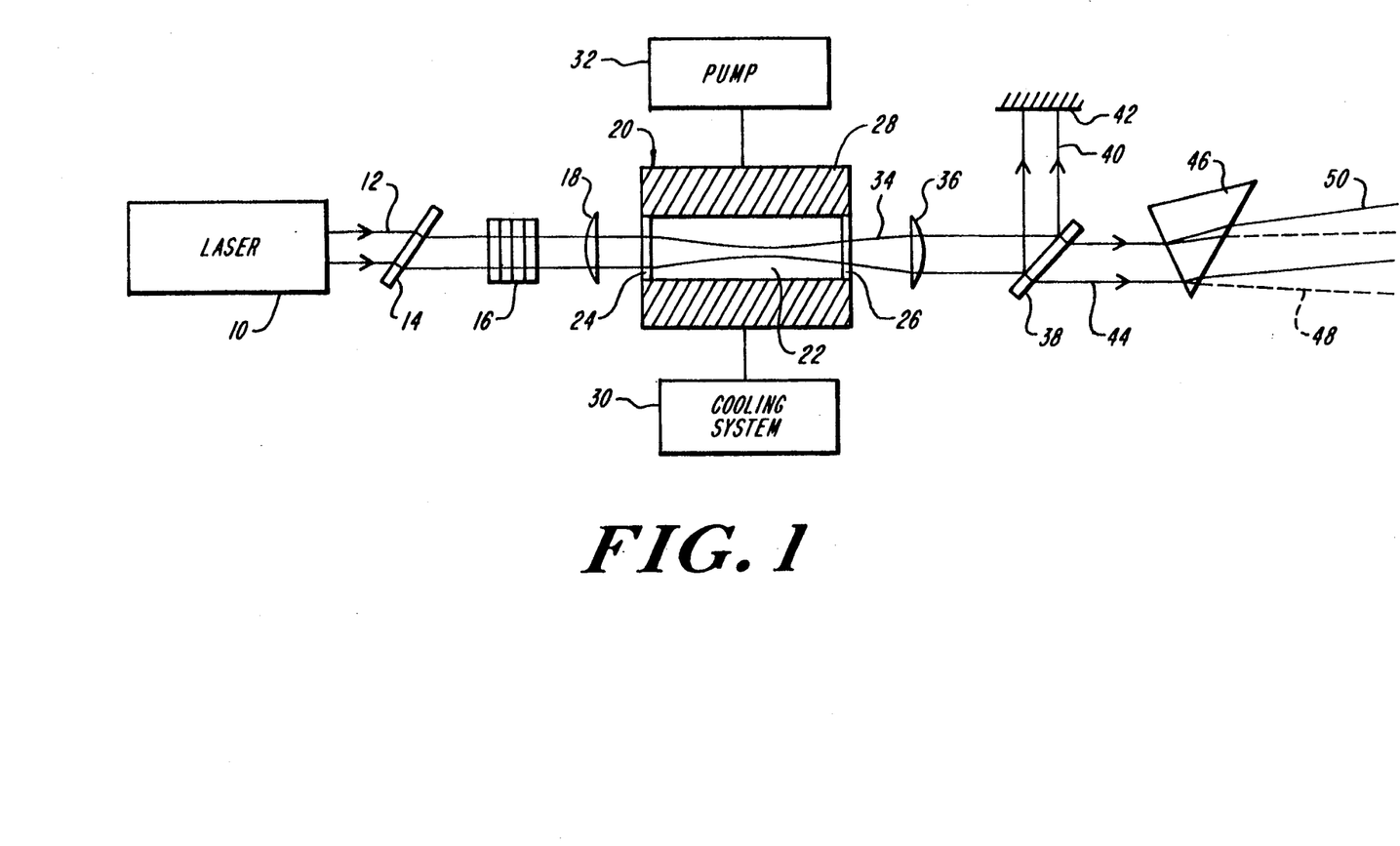
FIG. 1 is a schematic diagram of an infrared laser system in accordance with the present invention.

An infrared laser system in accordance with the present invention is shown in FIG. 1. A laser 10 generates a laser beam 12 at a wavelength of 1.06 micrometers ($\mu m$). The laser 10 is a pulsed. neodymium laser and is preferably a neodymium-doped yttrium aluminum garnet (Nd:YAG) laser. A neodymium glass laser can also be utilized when a relatively low pulse repetition rate is acceptable. As described hereinafter, the laser 10 can be a Q-switched device or a mode-locked device, depending on the required pulse width. The laser beam 12 is directed through a polarizer 14, a Faraday rotator 16 and a lens 18 to a Raman cell 20. The Raman cell 20 includes a cavity 22 that contains a generally cylindrical Raman active medium in liquid form. The cavity 22 is defined by an input window 24, an output window 26 and a generally cylindrical Raman cell wall 28.

The laser beam 12 is directed through the input window 24, the Raman active medium and the output window 26. When the peak power of the laser beam 12 is above a Raman threshold of the medium, radiation is generated at a wavelength that is longer than the wavelength of the laser beam 12 by stimulated Raman scattering. In accordance with the present invention, Raman active media for conversion of the laser beam at 1.06 micrometers to wavelengths of about 1.5 micrometers, wavelengths of about 2.8–2.9 micrometers, or both, are provided. The Raman active media are discussed in detail hereinafter.

The polarizer 14 and the Faraday rotator 16 isolate the laser 10 from radiation that is backscattered from the Raman cell 20. Other techniques for suppressing backscattered radiation are known in the art. The laser beam 12 is focused in the Raman active medium by lens 18. In cases where the peak power of the laser beam 12 is sufficiently high, the lens 18 can be omitted, and a collimated laser beam can be directed through the Raman cell 20. All the optical elements in the laser system preferably include an antireflection coating that is effective to reduce reflections at 1.06 micrometers.

The wall 28 of Raman cell 20 is preferably thermally conductive to conduct heat away from the Raman active medium. An active cooling system 30 can also be used for cooling the Raman cell 20. The cooling system 30 can, for example, include a system for circulating a cooling fluid such as water through the Raman cell wall 28 for removal of heat generated in the Raman active medium. A pump 32 can be used for circulating the Raman active medium through the cavity 22.

An output beam 34 from the Raman cell 20 is directed through a lens 36 to a dichroic beam splitter 38. The output beam 34 is collimated by lens 36 and is split into its component wavelengths by beam splitter 38. The beam splitter 38 directs a first output beam component 40 at 1.06 micrometers to a beam dump 42. A second output beam component 44 includes radiation generated by the Raman active medium. Depending on the Raman active medium utilized in Raman cell 20 and the peak power of laser beam 12, the second beam component 44 can include radiation at about 1.5 micrometers, radiation at about 2.8-2.9 micrometers, or both. When the second beam component 44 contains radiation at about 1.5 micrometers and about 2.8-2.9 micrometers, a prism 46 can be utilized to separate these wavelengths. The prism 46 separates the second beam component 44 into a third beam component 48 at about 1.5 micrometers and a fourth beam component 50 at about 2.8-2.9 micrometers.

The components of the laser system must be essentially transparent to radiation at 1.06 micrometers. The input window 24 can, for example, be fused silica. The output window 26 and the lens 36 must be transparent to radiation in the wavelength range of about 1-3 micrometers. A suitable material for these components is magnesium fluoride. A suitable material for the prism 46 is calcium fluoride.

The generation by the Raman active medium of radiation at a wavelength longer than the radiation of the laser beam 12 occurs as a result of the process of stimulated Raman scattering. When the peak power of the laser beam 12 exceeds a predetermined threshold, the Raman active medium generates coherent radiation at a wavelength that is a function of the input wavelength and the Raman active medium. The frequency shift and the Raman gain coefficient are characteristics of the medium. In accordance with the present invention, liquid ethanol-$d_1$ ($CH_3CH_2OD$) or liquid methanol-$d_1$ ($CH_3OD$) is used to generate wavelengths of about 1.5 micrometers. Further in accordance with the invention, liquid ethanol-$d_1$ or liquid methanol-$d_1$ is used to generate wavelengths of about 2.8-2.9 micrometers. Details regarding the Raman active media and the characteristics of the laser 10 are described below.

The threshold peak power of laser beam 12 that is required for stimulated Raman scattering in the focused geometry shown in FIG. 1 is given by:

$$G = (2g\, P/\lambda)\tan^{-1}(1 d^2/2\pi\lambda f^2 N) \quad (1)$$

where G is the total integrated gain, P is the laser peak power, g is the Raman gain coefficient, $\lambda$ is the wavelength of laser beam 12 (1.06 micrometers), l is the length of the Raman cell 20 along the optical beam path, f is the focal length of lens 18, d is the diameter of laser beam 12 at the lens 18, and N is the ratio of the area in the focal spot to the area of a diffraction limited beam. In order to determine the threshold power P, the total gain G is set at 30. The Raman gain coefficient g for each Raman active medium is specified in Table I below. The remaining parameters are determined from the geometry of the laser system. As an example, for d=0.3 cm, f=l=10 cm and N=1, the threshold peak power P for conversion to 1.54 micrometers of a neodymium YAG laser in ethanol-$d_1$ is 0.56 megawatt. For a Q-switched laser having a pulse width of 5 nanoseconds, this corresponds to 2.8 millijoules (mJ) per pulse. The power requirement for the generation of second Stokes light at 2.8 micrometers is three times larger.

The properties of the Raman active media in accordance with the present invention are summarized in Table I below. In Table I, g represents the Raman gain coefficient, $T_2$ represents the Raman lifetime, $g_B$ represents the Brillouin gain coefficient and $T_B$ represents the Brillouin lifetime. The data in Table I is taken from published literature.

TABLE I

| Medium | Raman Shift ($cm^{-1}$) | g(cm/GW) at $\lambda_s = 1.5\,\mu m$ | $T_2$ (psec) | $g_B$ (cm/GW) | $T_B$ (nsec) |
|---|---|---|---|---|---|
| $CH_3CH_2OH$ | 2928 | 1.8 | 2 | 12 | 2.8 |
| $CH_3CH_2OD$ | 2928* | 1.8* | 2* | 12* | 2.8* |
| $CH_3OH$ | 2834 | 0.8 | 2 | 13 | 4 |
|  | 2944 | 0.6 | 3 |  |  |
| $CH_3OD$ | 2834* | 0.8* | 2* | 13* | 4* |
|  | 2944* | 0.6* | 3* |  |  |

*Results from measurements in $d_1$ alcohols are unknown, but the Raman scattering and Brillouin backscattering properties are expected to be the same as those of ordinary alcohols.

Figure 2:
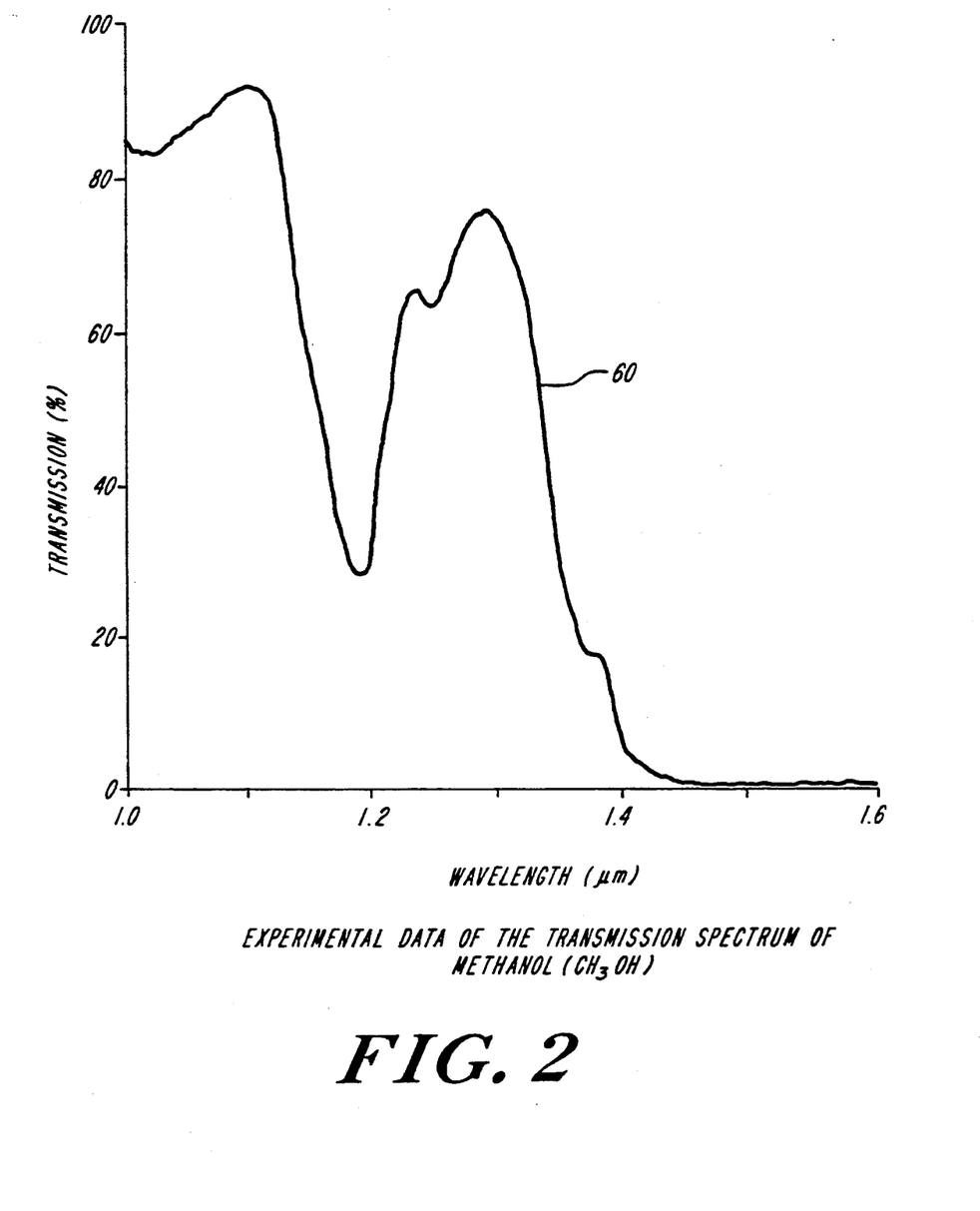
FIG. 2 is a graph showing the transmission spectrum of 1 cm of methanol at wavelengths between 1.0 and 1.6 micrometers.
Figure 3:
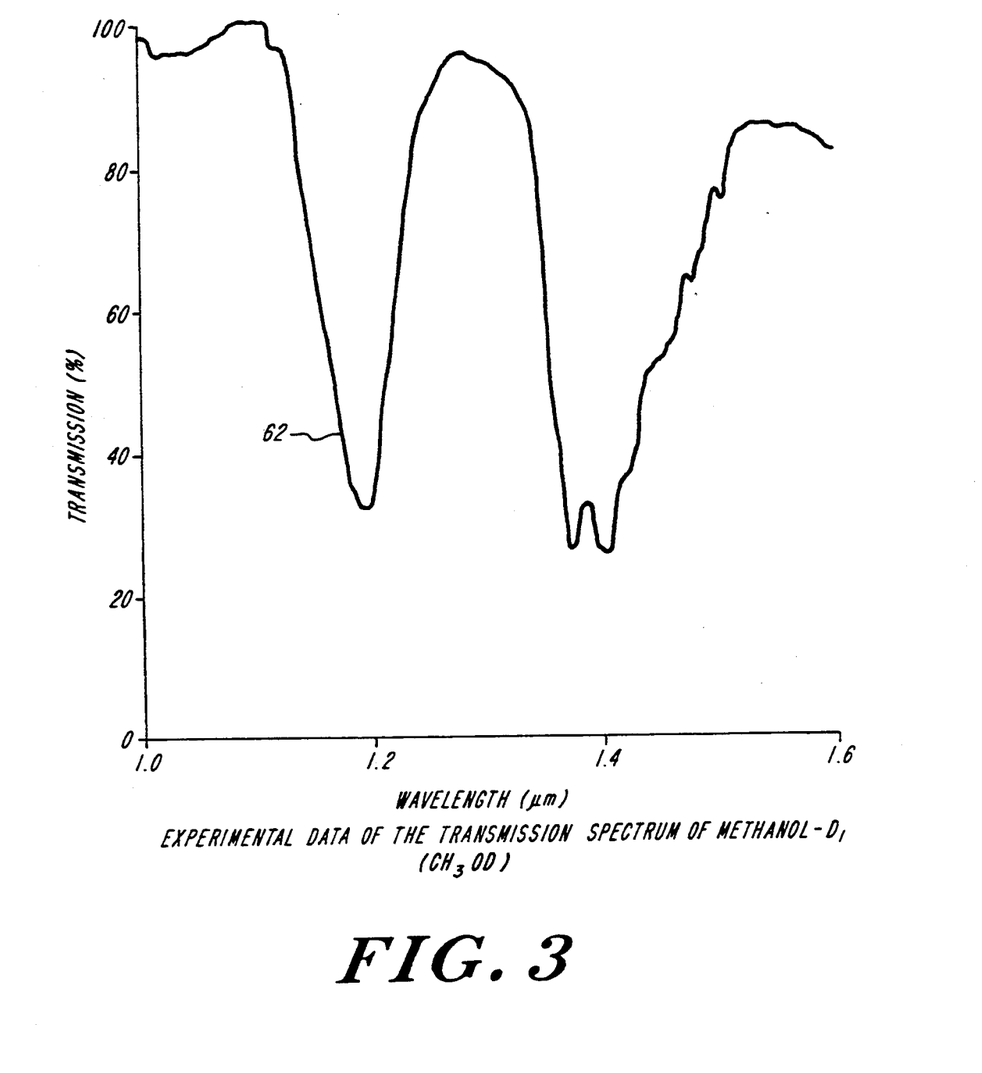
FIG. 3 is a graph showing the transmission spectrum of 1 cm of methanol-$d_1$ at wavelengths between 1.0 and 1.6 micrometers.
Figure 4:
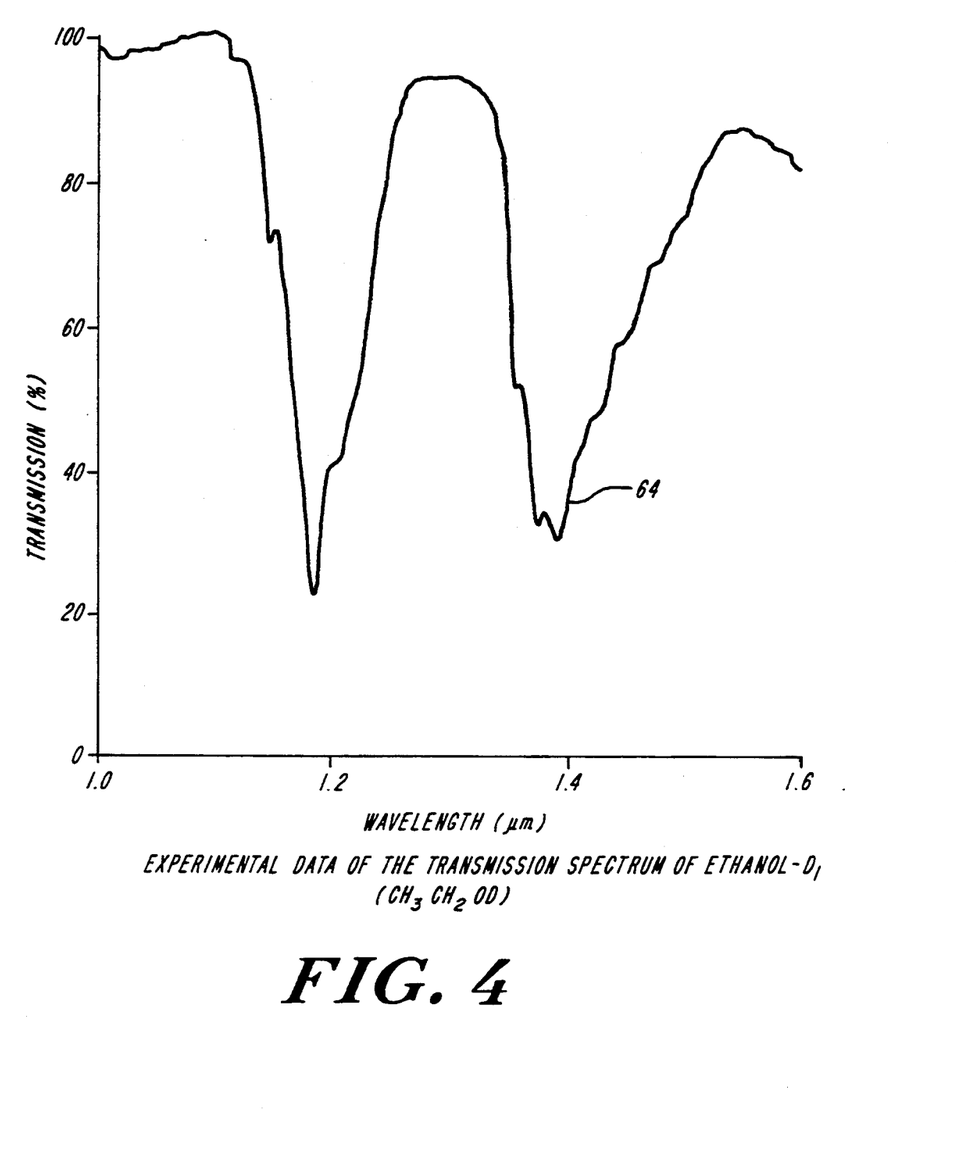
FIG. 4 is a graph showing the transmission spectrum of 1 cm of ethanol-$d_1$ at wavelengths between 1.0 and 1.6 micrometers.

According to a first embodiment of the invention, ethanol-$d_1$ and methanol-$d_1$ are used for Raman conversion of a neodymium YAG laser at 1.06 micrometers to the first Stokes wavelengths at 1.54 micrometers (ethanol-$d_1$) or 1.51 and 1.54 micrometers (methanol-$d_1$). The primary difference between alcohols and deuterated $d_1$ alcohols is a shift of the OH stretch frequency to an OD frequency and a dramatic increase in transmission at the relevant wavelengths without a change in the Raman properties due to the $CH_3$ stretch mode. In FIG. 2, the transmission spectrum of 1 cm of methanol, indicated by curve 60, shows large absorption near 1.5 micrometers. The same result was found for ethanol. By comparison, the spectra of methanol-$d_1$ (curve 62 in FIG. 3) and ethanol-$d_1$ (curve 64 in FIG. 4) show transmission in excess of 80% near 1.5 micrometers. This result makes them suitable Raman liquids. The spectra shown in FIGS. 2-6 were obtained on a Cary photospectrometer.

Figure 5:
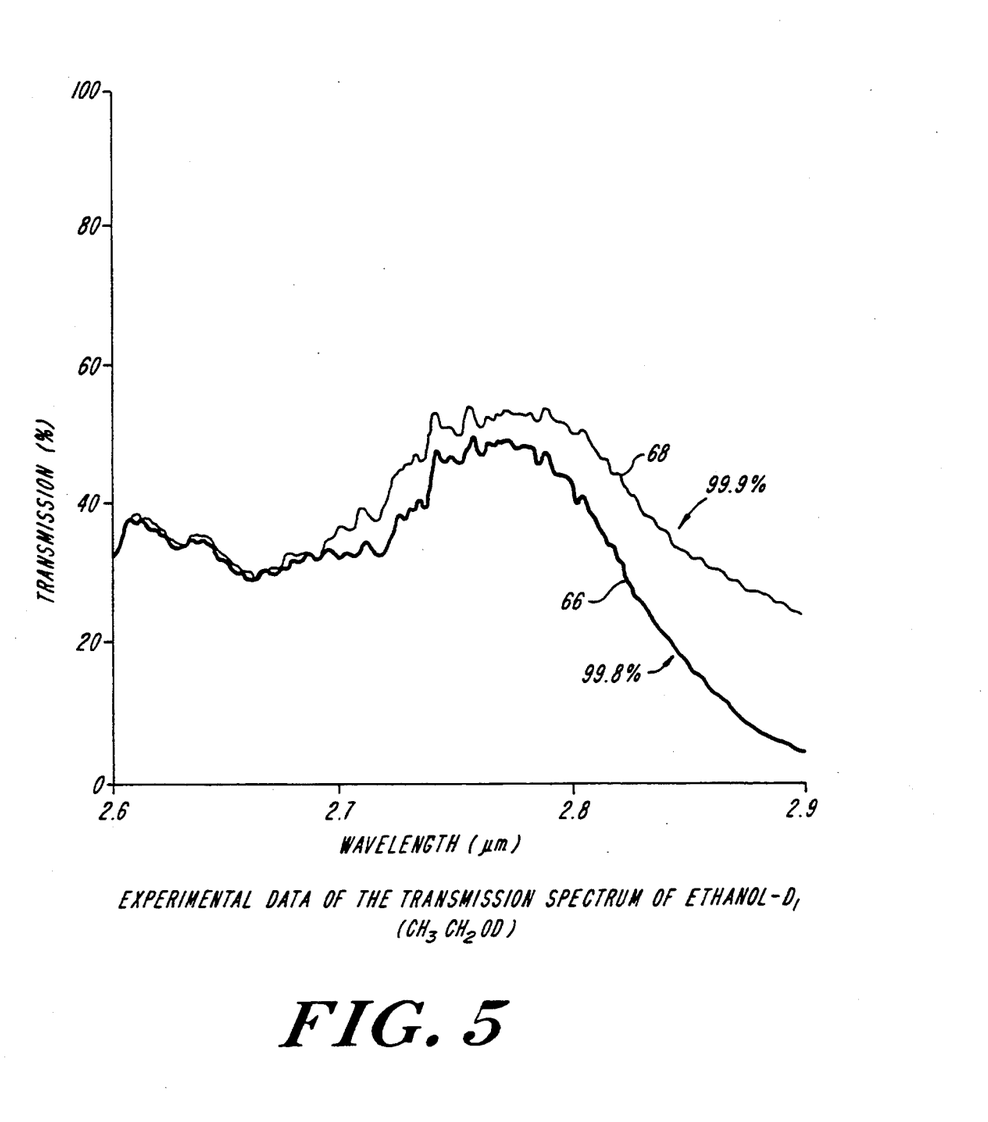
FIG. 5 is a graph showing the transmission spectra of 1 mm of ethanol-$d_1$ at 99.8% and 99.9% purity at wavelengths between 2.6 and 2.9 micrometers.

According to a second embodiment of the invention, ethanol-$d_1$ and methanol-$d_1$ are used for conversion of laser radiation at 1.06 micrometers to the second Stokes light near 2.8 micrometers. Because of the two first Stokes components, methanol-$d_1$ is believed to produce up to four second Stokes wavelengths at a significantly reduced efficiency and is therefore less preferred than ethanol-$d_1$. As the absorption spectra of 1 mm ethanol-$d_1$ in FIG. 5 indicate, the results are very sensitive to the presence of impurities. Curve 66 is the spectrum of ethanol-$d_1$ at 99.8% purity, and curve 68 is the spectrum of ethanol-$d_1$ at 99.9% purity. The major contaminant is water with an absorption coefficient, $\alpha_w = 10^4\, cm^{-1}$, at these wavelengths. The results are consistent with the presence of 0.1% water in the ethanol-$d_1$, and the absorption coefficient is on the order of $\alpha_a = 10\, cm^{-1}$. In order to overcome the absorption, one requires $gI > \alpha_a$, where g is the Raman gain coefficient at 2.8 $\mu m$ and I is the light intensity at 1.5 $\mu m$. This leads to intensities greater than 10 GW/$cm^2$. Under these conditions, the second Stokes light can increase exponentially and may saturate the contaminant water absorption. For laser pulses shorter than the water relaxation time of $T_r = 20$ picoseconds (psec), the water absorption $\alpha_w$ decreases according to $$\alpha_w(F) = \alpha_w/(1 + F/F_s) \quad (2a)$$

where F is the laser fluence, $F_s = \hbar\omega/2\sigma_a$ is the saturation fluence, $\hbar$ is the Planck constant, $\omega$ is the radian frequency at 2.8 $\mu m$ and $\sigma_a$ is the water absorption cross-section at the same wavelength. With $\sigma_a = 3 \times 10^{-19}\, cm^2$, one finds $F_s = 0.1$ J/$cm^2$. The output laser fluence, F, at 2.8 $\mu m$ should exceed this value by at least an order of magnitude. For laser pulses longer than 20 psec, the water absorption decreases according to $$a_w(I) = a_w/(1 + I/I_s) \quad (2b)$$

where I is the laser intensity at 2.8 μm and $I_s = \hbar\omega/2\sigma_a T_r$ is the saturation intensity. The value of $I_s$ for water near 2.8 μm is estimated at $I_s = 5$ GW/cm². Output intensities in excess of 50 GW/cm² will be required. This can be achieved with pulselengths of 100 psec or less, but not with nanosecond pulses. The required intensity is believed to be below that for optical breakdown. Clearly, mode-locked Nd:YAG lasers are the preferred system for generation of Raman shifted 2.8 μm radiation.

One problem with the operation of Raman cells is Brillouin backscattering in which the laser beam is reflected by the Raman active medium and stimulated Raman scattering is suppressed or does not occur. Brillouin backscattering is virtually eliminated at short laser pulses by making it highly transient. The requirement for dominance of steady state Raman scattering over transient Brillouin backscattering can be expressed in terms of the laser pulselength, $T_p$, $$T_p < T_B(gG/4g_B) \quad (3)$$

where the parameters of the right hand side of equation (3) are defined in connection with Table I and equation (1).

In accordance with another feature of the invention, the Raman active medium in Raman cell 20 comprises liquid ethanol-d₁ or liquid methanol-d₁ and the laser 10 comprises a neodymium YAG laser with a pulse length $T_p$ given by equation (3). For conversion to 1.54 μm in ethanol-d₁ with G=50, the laser pulselength is less than 5 nsec. For conversion to 1.51 and 1.54 μm in methanol-d₁, the pulselength is less than 2 nsec. For conversion to second Stokes at 2.79 μm in ethanol-d₁, the Raman gain coefficient is reduced by a factor of 2 and the integrated gain is based on the peak power at the first Stokes radiation. With a G=50, one finds a laser pulselength of less than 2.5 nsec. The preferred laser 10 is a mode-locked neodymium YAG laser having a pulselength of 100 psec or less.

According to a further feature of the invention, the Brillouin backscattering can be reduced by the use of wideband lasers. Typical Q-switched neodymium YAG lasers have many longitudinal modes. The spacing between the modes, Ω, depends on the laser cavity and varies from 100 MHz to a few GHz. A laser bandwidth of 1 cm⁻¹ corresponds to 30 GHz and the spectrum may contain 10–100 longitudinal modes. The Brillouin gain coefficient for wideband lasers, $g_B(WB)$ is related to that for a single longitudinal mode (narrowband laser), $g_B$, by the equation scattering will dominate Brillouin backscattering when $g > g_B(WB)$.

According to yet another feature of the invention, the Brillouin backscattering can be reduced by increasing the viscosity, η, of the Raman medium. The Brillouin gain coefficient is inversely proportional to the viscosity, $g_B \propto \eta^{-1}$. A decrease in temperature to −50° C. increases the viscosity of ethanol by a factor of 6, which is sufficient to suppress Brillouin backscattering.

Figure 6:
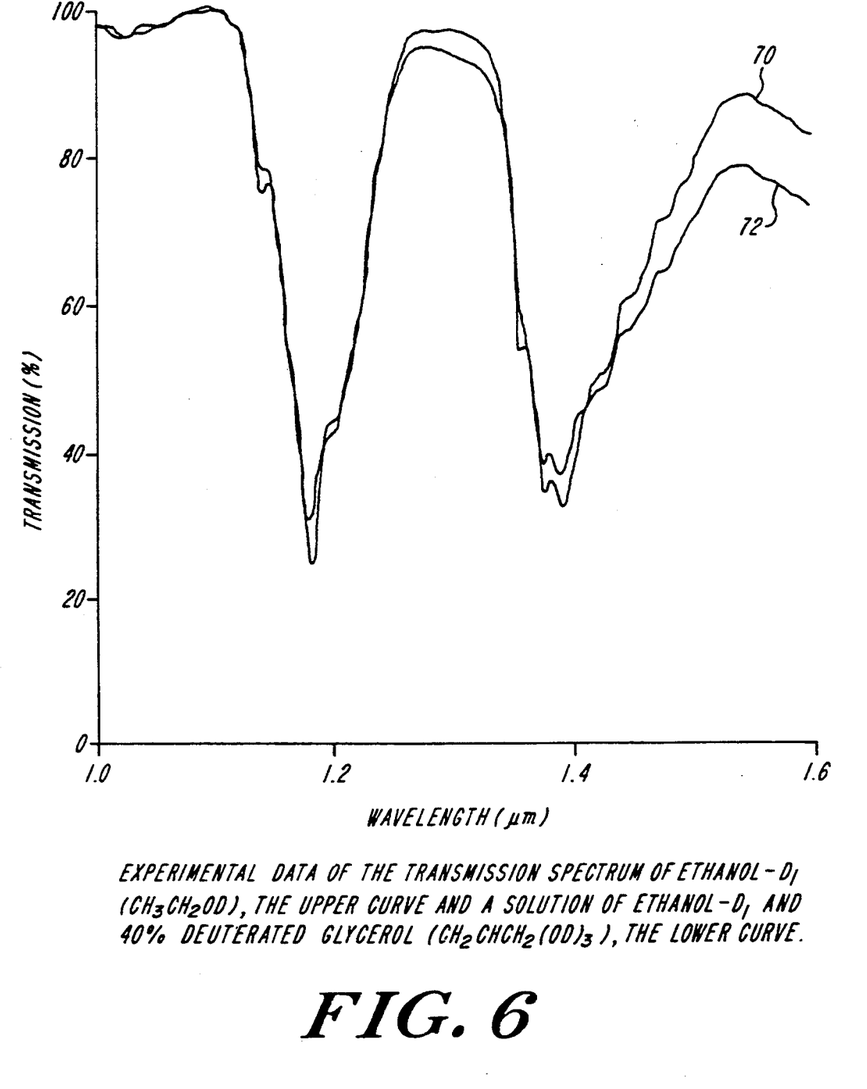
FIG. 6 is a graph showing the transmission spectra of 1 cm of 99.8% ethanol-$d_1$, and a solution of 99.8% ethanol-$d_1$ and 98% deuterated glycerol ($CH_2OD$-$CHODCH_2OD$, 40% by weight in the solution) at wavelengths between 1.0 and 1.6 micrometers.

A more promising approach is to add to the alcohols a highly viscous fluid, without changing the absorption at the relevant wavelengths. We have found such a solution, which represents another feature of the invention. FIG. 6 shows the absorption spectrum of pure ethanol-d₁ (indicated by curve 70) and a solution of ethanol-d₁ and 40% by weight deuterated glycerol (CH₂ODCHODCH₂OD) (indicated by curve 72). The solution has absorption properties similar to ethanol-d₁ but its viscosity is greater by a factor of 4. In this case, the Brillouin backscattering is reduced by a factor of 4, while Raman scattering is reduced only by 40%. The concentration of deuterated glycerol in ethanol-d₁ or methanol-d₁ is preferably in a range of about 20% to 60% by weight to provide sufficient viscosity to suppress Brillouin backscattering. Another feature of the invention is to use viscous solutions of ethanol-d₁ and methanol-d₁ to suppress Brillouin scattering and Raman shift the laser light without any constraints on the laser pulse length and bandwidth.

The quantum efficiency of Raman conversion is given by the ratio of the laser wavelength to the Stokes wavelength. With a pump laser beam of 1.06 micrometers, the quantum efficiency for generation of a first Stokes component at 1.5 micrometers is 67%, and for the generation of a second Stokes component at 2.8–2.9 micrometers the quantum efficiency is 36–34%. Based on experiments with deuterium at excimer laser wavelengths and alcohols with frequency doubled neodymium YAG lasers, one can expect Raman conversion in excess of 50% of the quantum efficiency. The estimated power conversion efficiencies with the present invention are at least 50% to obtain radiation at 1.5 micrometers and at least 20% for radiation at 2.8–2.9 micrometers. This compares very favorably with previously reported results of 3% conversion efficiency to 2.8 micrometers using methane (CH₄) as the Raman medium.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An infrared laser system comprising:
  a neodymium laser for generating a pulsed laser beam $$g_B(WB) = g_B \frac{1}{M^2} \sum_{m,p=0}^{M-1} \frac{1 + (m-p)\Omega/W_B}{\left[1 + \frac{(m-p)\Omega}{W_B}\right]^2 + \left(\frac{2\Omega}{\Gamma_B}\right)^2 (m-p)^2 \left[1 + \frac{(m+p)\Omega}{2W_B}\right]^2} \quad (4)$$

where $g_B$ is given in Table I, $\Gamma_B = T_B^{-1}$ is the Brillouin bandwidth, M is the number of longitudinal modes and $\omega_B$ is the Brillouin frequency shift. For the alcohols, $\omega_B$ is of the order of 4–5 GHz. A typical reduction in the wideband gain coefficient is $g_B(WB) = g_B/M$. Raman having a wavelength of 1.06 micrometers;
a Raman cell containing a Raman active medium selected from the group consisting of ethanol-d₁ and methanol-d₁; and
means for coupling said laser beam through said Raman cell, said laser beam having sufficient power to cause emission of light from said Raman active medium.

2. An infrared laser system as defined in claim 1 wherein said neodymium laser has a pulse width of 100 picoseconds or less.

3. An infrared laser system as defined in claim 1 wherein said laser comprises a mode-locked neodymium YAG laser.

4. An infrared laser system as defined in claim 1 wherein said neodymium laser has a pulse width $T_p$ less than $T_B(gG/4g_B)$, where $T_B$ is the Brillouin lifetime, g is the Raman gain coefficient, G is the total integrated gain and $g_B$ is the Brillouin gain coefficient.

5. An infrared laser system as defined in claim 1 wherein said neodymium laser comprises a broadband Q-switched neodymium laser having a bandwidth $\Gamma_B$ of $1 \text{ cm}^{-1}$ or more.

6. An infrared laser system as defined in claim 1 wherein said neodymium laser comprises a broadband Q-switched neodymium laser in which the wideband Brillouin gain coefficient is smaller than the Raman gain coefficient.

7. An infrared laser system as defined in claim 1 wherein said Raman active medium comprises ethanol-$d_1$ and wherein said laser beam has sufficient power to cause emission of light from said Raman active medium at 1.54 micrometers.

8. An infrared laser system as defined in claim 1 wherein said Raman active medium comprises ethanol-$d_1$ and said laser beam has sufficient power to cause emission of light from said Raman active medium at 2.79 micrometers.

9. An infrared laser system as defined in claim 1 wherein said Raman active medium comprises methanol-$d_1$ and wherein said laser beam has sufficient power to cause emission of light from said Raman active medium at 1.51 micrometers and 1.54 micrometers.

10. An infrared laser system as defined in claim 1 wherein said Raman active medium comprises methanol-$d_1$ and wherein said laser beam has sufficient power to cause emission of light from said Raman active medium at about 2.8-2.9 micrometers.

11. An infrared laser system as defined in claim 1 further including means for increasing the viscosity of said Raman active medium sufficiently to suppress Brillouin backscattering.

12. An infrared laser system as defined in claim 11 wherein said means for increasing viscosity of said Raman active medium comprises means for cooling said Raman active medium sufficiently to increase the viscosity thereof.

13. An infrared laser system as defined in claim 12 wherein said means for cooling is sufficient to reduce the temperature of said Raman active medium to about $-50°$ C.

14. An infrared laser system as defined in claim 11 wherein said means for increasing the viscosity of said Raman active medium comprises a viscous material mixed with said Raman active medium.

15. An infrared laser system as defined in claim 14 wherein said viscous material comprises deuterated glycerol.

16. An infrared laser system as defined in claim 15 wherein said deuterated glycerol comprises about 40% by weight of said Raman active medium.

17. An infrared laser system as defined in claim 1 further including a viscous material mixed with said Raman active medium.

18. An infrared laser system as defined in claim 17 wherein said viscous material comprises deuterated glycerol.

19. An infrared laser system as defined in claim 18 wherein said deuterated glycerol has a concentration of about 20% to 60% by weight of said Raman active medium.

20. An infrared laser system as defined in claim 18 wherein said-deuterated glycerol has a concentration of about 40% by weight of said Raman active medium.

21. An infrared laser system as defined in claim 1 wherein said Raman cell includes an input window for receiving said laser beam, an output window and means for containing said Raman active medium between said input window and said output window, and said coupling means includes a lens for focusing said laser beam in said Raman active medium.

22. An infrared laser system as defined in claim 1 wherein said coupling means includes a lens for focusing said laser beam in said Raman active medium.

23. An infrared laser system as defined in claim 22 wherein said coupling means further includes a polarizer and Faraday rotator for isolating the laser beam from radiation that is backscattered from said Raman cell.

24. An infrared laser system as defined in claim 23 wherein said Raman cell further includes means for cooling said Raman active medium.

25. An infrared laser system as defined in claim 22 wherein said coupling means further includes means for isolating the laser from radiation that is backscattered from said Raman cell.

26. An infrared laser system as defined in claim 1 further including beam splitting means for separating said laser beam at 1.06 micrometers from the light emitted from said Raman active medium.

27. An infrared laser system as defined in claim 1 further including means for circulating said Raman active medium through said Raman cell.

* * * * *